(12) United States Patent  
Peri et al.

(10) Patent No.: US 11,688,073 B2
(45) Date of Patent: Jun. 27, 2023

(54) METHOD AND SYSTEM FOR DEPTH MAP RECONSTRUCTION

(71) Applicant: Samsung Electronics Company, Ltd., Suwon-si (KR)

(72) Inventors: Christopher A. Peri, Mountain View, CA (US); Yingen Xiong, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/198,997

(22) Filed: Mar. 11, 2021

(65) Prior Publication Data

US 2021/0319569 A1  Oct. 14, 2021

Related U.S. Application Data

(60) Provisional application No. 63/010,016, filed on Apr. 14, 2020.

(51) Int. Cl.
*G06T 7/13* (2017.01)
*G06T 7/50* (2017.01)
(Continued)

(52) U.S. Cl.
CPC ............ *G06T 7/13* (2017.01); *G06T 7/50* (2017.01); *G06V 10/44* (2022.01); *G06V 20/20* (2022.01);
(Continued)

(58) Field of Classification Search
CPC ... G06T 7/50; G06T 7/13; G06T 2207/10024; G06T 2207/10028; G06T 2210/08; G09G 3/003; G09G 2350/00; G09G 2370/02
See application file for complete search history.

(56) References Cited

U.S. PATENT DOCUMENTS 8,737,769 B2   5/2014  Finch
9,443,355 B2   9/2016  Chan
(Continued)

FOREIGN PATENT DOCUMENTS

CN   110738731    1/2020
CN   111563923    11/2020
(Continued)

OTHER PUBLICATIONS

International Search Report and Written Opinion for Application No. PCT/KR2021/013997 (8 pages), dated Jan. 25, 2022.
(Continued)

*Primary Examiner* — Sing-Wai Wu
*Assistant Examiner* — Khoa Vu

(57) ABSTRACT

A method includes accessing image data and depth data corresponding to image frames to be displayed on an extended reality (XR) display device, and determining sets of feature points corresponding to the image frames based on a multi-layer sampling of the image data and the depth data. The method further includes generating a set of sparse feature points based on an integration of the sets of feature points. The set of sparse feature points are determined based on relative changes in depth data with respect to the sets of feature points. The method further includes generating a set of sparse depth points based on the set of sparse feature points and the depth data and sending the set of sparse depth points to the XR display device for reconstruction of a dense depth map corresponding to the image frames utilizing the set of sparse depth points.

17 Claims, 10 Drawing Sheets

(51) Int. Cl.
   *G09G 3/00*     (2006.01)
   *G06V 10/44*    (2022.01)
   *G06V 20/20*    (2022.01)
   *G06V 10/40*    (2022.01)

(52) U.S. Cl.
   CPC .... *G09G 3/003* (2013.01); *G06T 2207/10024* (2013.01); *G06T 2207/10028* (2013.01); *G06T 2210/08* (2013.01); *G06V 10/513* (2022.01); *G09G 2350/00* (2013.01); *G09G 2370/02* (2013.01)

(56) References Cited

U.S. PATENT DOCUMENTS

| | | | |
|---|---|---|---|
| 10,326,500 | B1 | 6/2019 | Qu |
| 10,965,929 | B1 | 3/2021 | Bellows |
| 11,032,530 | B1 | 6/2021 | Bleyer et al. |
| 11,107,290 | B1 | 8/2021 | Peri |
| 11,288,543 | B1* | 3/2022 | Tovchigrechko ...... G06V 10/82 |
| 2003/0091225 | A1 | 5/2003 | Chen |
| 2007/0024614 | A1 | 2/2007 | Tam |
| 2007/0146232 | A1 | 6/2007 | Redert et al. |
| 2011/0249122 | A1 | 10/2011 | Tricoukes |
| 2012/0134597 | A1 | 5/2012 | Finch |
| 2015/0235447 | A1 | 8/2015 | Abovitz |
| 2016/0248995 | A1 | 8/2016 | Mullins |
| 2016/0267717 | A1 | 9/2016 | Bar-Zeev |
| 2017/0084074 | A1 | 3/2017 | Hwang |
| 2017/0294021 | A1 | 10/2017 | Khan |
| 2018/0063511 | A1 | 3/2018 | Paik |
| 2018/0089901 | A1 | 3/2018 | Rober |
| 2018/0234669 | A1 | 8/2018 | Chen |
| 2018/0276885 | A1* | 9/2018 | Singh ...................... G06T 7/579 |
| 2018/0278918 | A1 | 9/2018 | Peri |
| 2019/0041976 | A1 | 2/2019 | Veeramani |
| 2019/0228504 | A1 | 7/2019 | Tong |
| 2019/0244413 | A1 | 8/2019 | Smith |
| 2019/0333263 | A1 | 10/2019 | Melkote Krishnaprasad |
| 2020/0082554 | A1 | 3/2020 | Wang |
| 2020/0098186 | A1 | 3/2020 | Xue |
| 2020/0193623 | A1 | 6/2020 | Liu |
| 2020/0260029 | A1 | 8/2020 | Kang |
| 2020/0273190 | A1* | 8/2020 | Ye ........................... G06T 7/579 |
| 2020/0394452 | A1* | 12/2020 | Ma ............................ G06T 7/90 |
| 2020/0394848 | A1* | 12/2020 | Choudhary ............... G06T 7/50 |
| 2020/0410766 | A1 | 12/2020 | Swaminathan |
| 2021/0004979 | A1 | 1/2021 | Valentin |
| 2021/0134048 | A1* | 5/2021 | Weng ...................... G06T 15/10 |
| 2021/0209859 | A1* | 7/2021 | Miranda ................. G06T 17/05 |
| 2021/0279949 | A1* | 9/2021 | Cao ......................... G06T 17/00 |
| 2021/0398306 | A1 | 12/2021 | Bleyer |

FOREIGN PATENT DOCUMENTS

| | | |
|---|---|---|
| EP | 3699736 A1 | 8/2020 |
| EP | 3349176 B1 | 12/2021 |
| IN | 201821033606 A | 3/2020 |
| JP | 2020-061187 | 4/1920 |
| KR | 20100034789 | 4/2010 |
| KR | 20100062360 | 6/2010 |
| KR | 1290197 | 7/2013 |
| KR | 20140007367 A | 1/2014 |
| KR | 20170018930 | 2/2017 |
| KR | 20170029365 A | 3/2017 |
| KR | 1020170023110 | 3/2017 |
| KR | 1020180066551 | 6/2018 |

OTHER PUBLICATIONS

Badias, Alberto, Iciar Alfaro, David González, Francisco Chinesta, and Elías Cueto. "Reduced order modeling for physically-based augmented reality." *Computer Methods in Applied Mechanics and Engineering* 341 (2018): 53-70.

Notice of Allowance in U.S. Appl. No. 17/338,521, dated Jun. 30, 2022.

PCT Search Report and written opinion in PCT/KR2022/001084, dated May 4, 2022.

Fangchang Ma et al., 'Sparse-to-Dense: Depth Prediction from Sparse Depth Samples and a Single Image', arXiv:1709.07492v1, pp. 1-8, Sep. 2017.

Sung-Hoon Im et al., 'Depth From Accidental Motion Using Geometry Prior', 2015 IEEE International Conference on Image Processing (ICIP), pp. 4160-4164, Sep. 2015.

Lam Huynh et al., 'Boosting Monocular Depth Estimation with Lightweight 3D Point Fusion', arXiv:2012.10296v1, pp. 1-10, 18, Dec. 2020.

Notice of Allowance in U.S. Appl. No. 17/338,52, dated Aug. 15, 2022.

Notice of Allowance in U.S. Appl. No. 17/338,521, dated Oct. 19, 2022.

* cited by examiner

METHOD AND SYSTEM FOR DEPTH MAP RECONSTRUCTION

PRIORITY

This application claims the benefit under 35 U.S.C. § 119(e) of U.S. Provisional Patent Application No. 63/010,016, filed 14 Apr. 2020, which is incorporated herein by reference.

TECHNICAL FIELD

This disclosure relates generally to database and file management within network environments, and in particular relates to depth maps for extended reality (XR) systems.

BACKGROUND

An extended reality (XR) system may generally include a computer-generated environment and/or a real-world environment that includes at least some XR artifacts. Such an XR system or world and associated XR artifacts typically include various applications (e.g., video games), which may allow users to utilize these XR artifacts by manipulating their presence in the form of a computer-generated representation (e.g., avatar). In typical XR systems, image data may be rendered on, for example, a robust head-mounted display (HMD) that may be coupled through a physical wired or wireless connection to a base graphics generation device or cloud based service responsible for generating the image data. However, in some instances, in which the HMD includes, for example, lightweight XR glasses or spectacles as opposed to more robust headset devices, the XR glasses or spectacles may, in comparison, include reduced processing power, low-resolution/low-cost cameras, and/or relatively simple tracking optics. Additionally, due to the smaller architectural area, the XR glasses or spectacles may also include reduced power management (e.g., batteries, battery size) and thermal management (e.g., cooling fans, heat sinks) electronics. This may often preclude such devices from maximizing performance while reducing power consumption. It may be thus useful to provide techniques to improve lightweight XR systems.

DESCRIPTION OF EXAMPLE EMBODIMENTS

Figure 1:
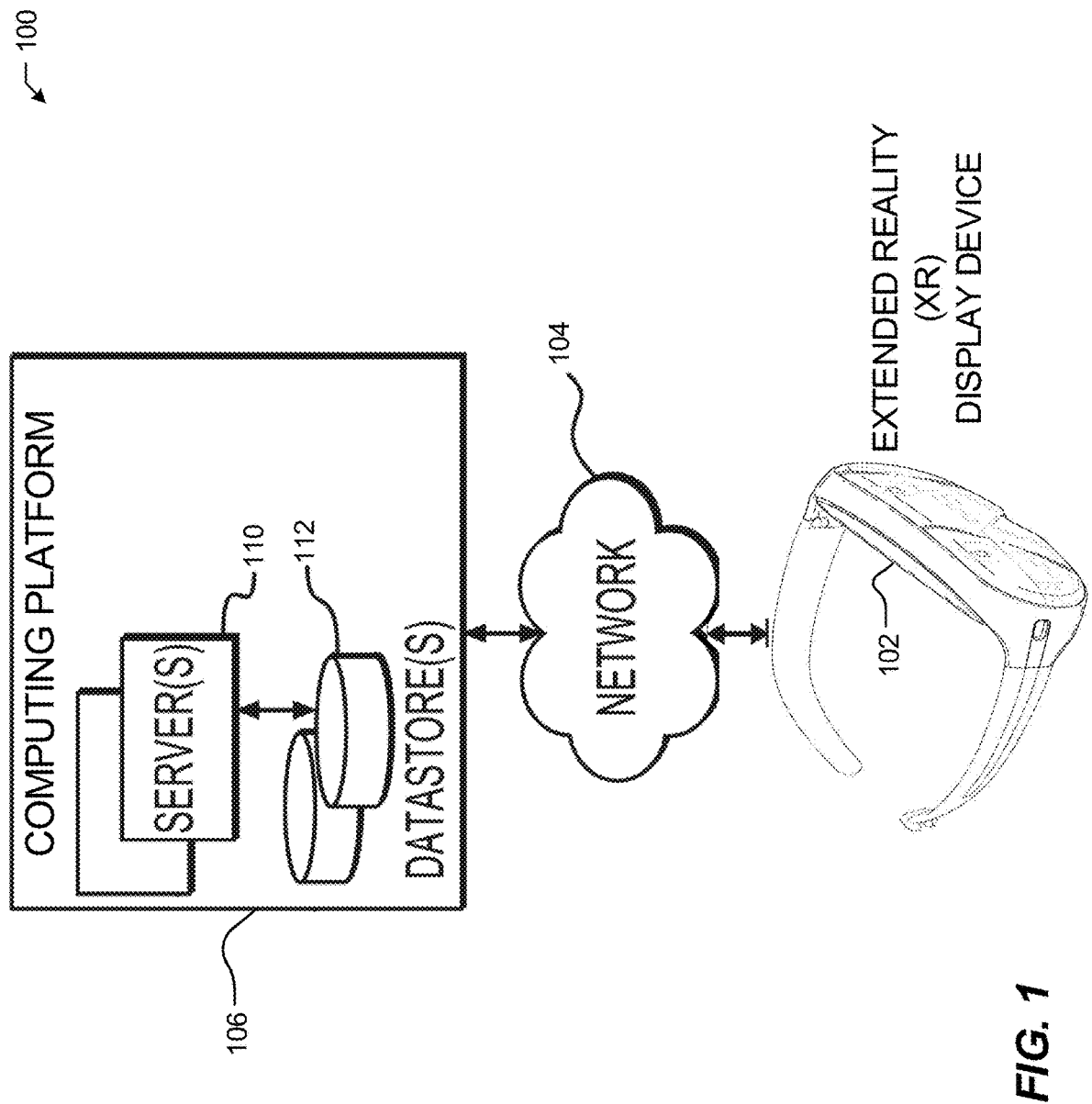
FIG. 1 illustrates an example extended reality (XR) system.

The present embodiments are directed toward techniques for generating a set of sparse depth points and reconstructing a dense depth map based on the generated sparse depth points to reduce data throughput and compute load between a computing device and an extended reality (XR) display device. In particular embodiments, a computing device may access image data and depth data corresponding to one or more image frames to be displayed on an extended reality (XR) display device associated with the computing device. In particular embodiments, the computing device may then determine a number of sets of feature points corresponding to the one or more image frames based on a multi-layer sampling of the image data and the depth data. For example, in particular embodiments, the number of sets of feature points may include two or more of a set of object feature points, a set of edge feature points, a set of object contour points, or a set of image contour points. In particular embodiments, the computing device may then determine a number of sets of feature points corresponding to the one or more image frames based on a multi-layer sampling of the image data and the depth data. For example, in particular embodiments, the multi-layer sampling of the image data and the depth data may be performed by extracting the number of sets of feature points utilizing two or more of a Difference of Gaussian (DoG) filter, a Laplacian of Gaussian (LoG) filter, a Canny filter, or a Sobel filter. For example, in particular embodiments, the number of sets of feature points are extracted for each of a number of scaled representations corresponding to the one or more image frames.

In particular embodiments, the computing device may then generate a set of sparse feature points based on an integration of the number of sets of feature points, in which the set of sparse feature points may be determined based on relative changes in depth data with respect to the plurality of sets of feature points. For example, in particular embodiments, the computing device may generate the set of sparse feature points by integrating the number of sets of feature points extracted for each of the plurality of scaled representations and removing a subset of feature points from the integrated number of sets of feature points based on relative changes in depth data between the subset of feature points and respective neighboring feature points. In particular embodiments, the computing device may then generate a set of sparse depth points based on the set of sparse feature points and the depth data. For example, in particular embodiments, the set of sparse depth points may be generated based on predetermined confidence scores associated with the set of sparse feature points, in which each predetermined confidence score may indicate a likelihood the associated feature point corresponds to a determinative feature of the one or more image frames. In particular embodiments, the computing device may then send the set of sparse depth points to the XR display device for reconstruction of the one or more image frames utilizing the set of sparse depth points. For example, in particular embodiments, the computing device may send the set of sparse depth points along with the image data to the XR display device, which may then reconstruct the one or more image frames by combining the image data with the corresponding set of sparse depth points.

Thus, in accordance with the presently disclosed embodiments, to reduce network traffic between the XR display device and an external computing device, and, by extension, to reduce power consumption and thermal output of the XR display device, the computing device may perform an adaptive process that extracts feature points from a depth map or one or more RGB-D image frames where depths suddenly change, such as object contours, object edges, and object features. Contrastingly, the computing device may forgo extracting feature points where depths change only minimally (e.g., smoothly transition) or do not change at all, such as planes, cubes, and smooth surfaces of the depth map or one or more RGB-D image frames. In this way, the computing device may provide to the XR display device a depth map for reconstruction and re-projection, including only sparse depth points and sufficient object information to effectively and efficiently recover the depth information of the original depth map or one or more original RGB-D image frames generated by the computing device. The presently disclosed embodiments may thus reduce the data throughput (e.g., Wi-Fi data throughput) and compute load between the computing device and the XR display device while maintaining desirable image quality with respect the reconstructed depth maps or RGB-D frames ultimately projected and/or re-projected onto the displays of the XR display device.

As used herein, "extended reality" may refer to a form of electronic-based reality that has been manipulated in some manner before presentation to a user, including, for example, virtual reality (VR), augmented reality (AR), mixed reality (MR), hybrid reality, simulated reality, immersive reality, holography, or any combination thereof. For example, "extended reality" content may include completely computer-generated content or partially computer-generated content combined with captured content (e.g., real-world images). In some embodiments, the "extended reality" content may also include video, audio, haptic feedback, or some combination thereof, any of which may be presented in a single channel or in multiple channels (such as stereo video that produces a three-dimensional (3D) effect to the viewer). Further, as used herein, it should be appreciated that "extended reality" may be associated with applications, products, accessories, services, or a combination thereof, that, for example, may be utilized to create content in extended reality and/or utilized in (e.g., perform activities) in extended reality. Thus, "extended reality" content may be implemented on various platforms, including a head-mounted device (HMD) connected to a host computer system, a standalone HMD, a mobile device or computing system, or any other hardware platform capable of providing extended reality content to one or more viewers. Furthermore, as used herein, a "current image frame" may refer to a most recent image frame or a most recent set of image frames that may be either sent (e.g., pushed) to an XR display device from a computing platform or requested or loaded (e.g., pulled) from the computing platform by the XR display device for image or depth processing and analysis. For example, in particular embodiments, the "current image frame" may simply correspond to the latest image frame (of an N set of RGB-D image frames being rendered by the computing platform) that may be pushed to, or pulled by, the XR display device. That is, all of the image frames of the N set of RGB-D image frames may not be provided from the computing platform to the XR display device, and thus the "current image frame" may simply refer to the most recent image that is indeed sent from the computing platform to the XR display device.

FIG. 1 illustrates an example extended reality (XR) system 100 that may be suitable for selectively re-projecting depth maps based on image and depth data and pose data updates, in accordance with presently disclosed embodiments. In particular embodiments, the XR system 100 may include an XR display device 102, a network 104, and a computing device 106. In particular embodiments, a user may wear the XR display device 102 that may display visual extended reality content to the user. The XR display device 102 may include an audio device that may provide audio extended reality content to the user. In particular embodiments, the XR display device 102 may include one or more cameras which can capture images and videos of environments. The XR display device 102 may include an eye tracking system to determine the vergence distance of the user. In particular embodiments, the XR display device 102 may include a lightweight head-mounted display (HMD) (e.g., goggles, eyeglasses, spectacles, a visor, and so forth). In particular embodiments, the XR display device 102 may also include a non-HMD device, such as a lightweight handheld display device or one or more laser projecting spectacles (e.g., spectacles that may project a low-powered laser onto a user's retina to project and display image or depth content to the user). In particular embodiments, the network 104 may include, for example, any of various wireless communications networks (e.g., WLAN, WAN, PAN, cellular, WMN, WiMAX, GAN, 6LowPAN, and so forth) that may be suitable for communicatively coupling the XR display device 102 to the computing device 106.

In particular embodiments, the computing device 106 may include, for example, a standalone host computing system, an on-board computer system integrated with the XR display device 102, a mobile device, or any other hardware platform that may be capable of providing extended reality content to the XR display device 102. In particular embodiments, the computing device 106 may include, for example, a cloud-based computing architecture (including one or more servers 108 and data stores 110) suitable for hosting and servicing XR applications or experiences executing on the XR computing device 102. For example, in particular embodiments, the computing device 106 may include a Platform as a Service (PaaS) architecture, a Software as a Service (SaaS) architecture, and an Infrastructure as a Service (IaaS), or other similar cloud-based computing architecture. As it may be appreciated, in particular embodiments in which the XR display device 102 includes lightweight devices, such as goggles, eyeglasses, spectacles, a visor, and so forth, the XR display device 102 may, due to the smaller architectural area, include reduced power management (e.g., batteries, battery size) and thermal management (e.g., cooling fans, heat sinks, and so forth) electronics.

Figure 2:
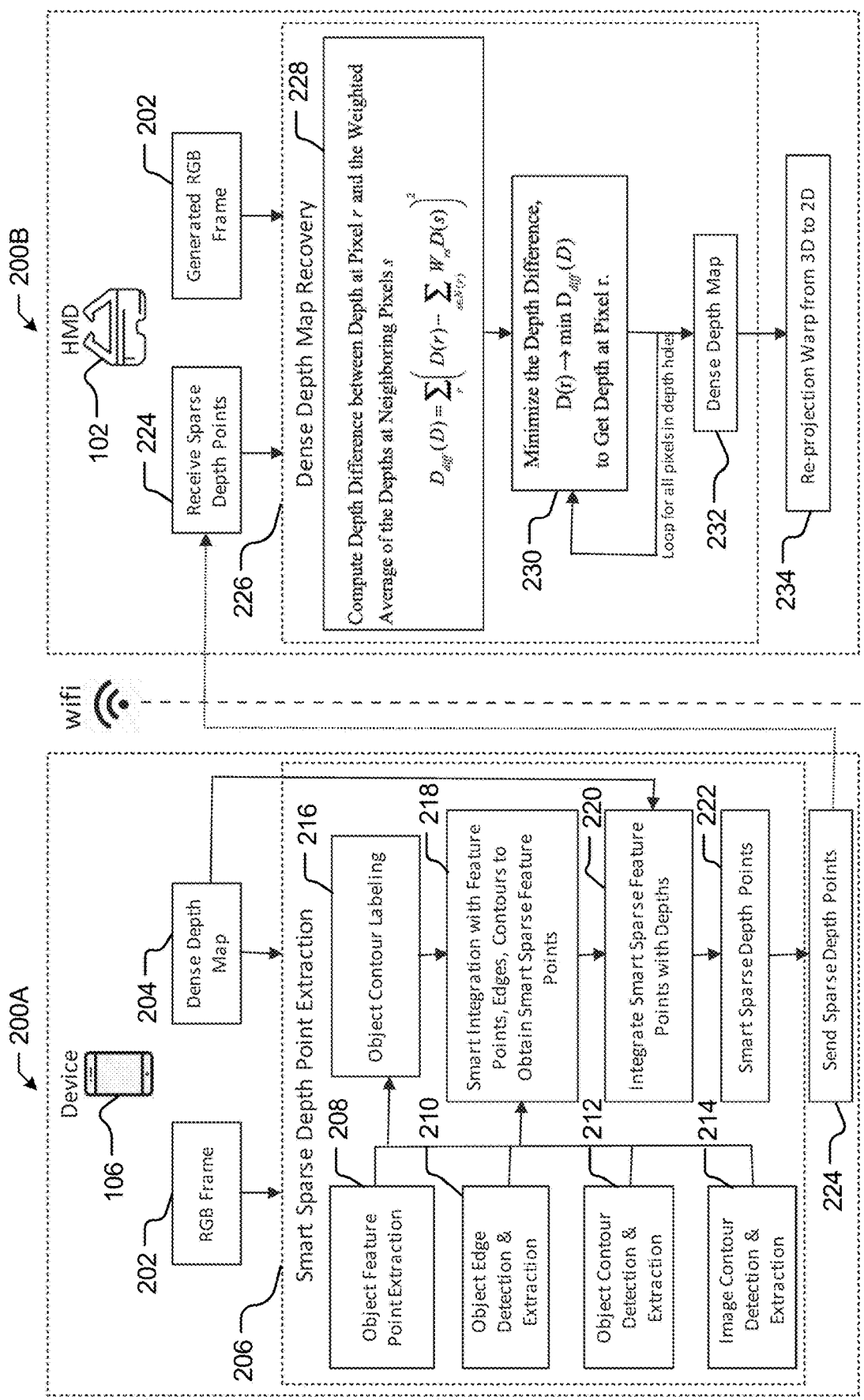
FIG. 2 illustrates respective workflow diagrams for generating a set of sparse depth points and reconstructing a dense depth map based on the generated sparse depth points, respectively.

FIG. 2 illustrates a workflow diagram 200A and a workflow diagram 200B for generating a set of sparse depth points and reconstructing a dense depth map based on the generated sparse depth points. In particular embodiments, the workflow diagram 200A may correspond to, and be performed, for example, by the computing device 106 as discussed above with respect to FIG. 1. Similarly, in particular embodiments, the workflow diagram 200B may correspond to, and be performed, for example, by the XR display device 102 as discussed above with respect to FIG. 1. In particular embodiments, the workflow diagram 200A may begin with the computing device 106 accessing updated (R)ed, (G)reen, (B)lue, image data 202A and (D)epth data 204 with respect to, for example, one or more 2D, 2.5D, or 3D images to be provided to the XR display device 102 for rendering to a user. In particular embodiments, the workflow diagram 200A may then continue with the computing device 106 performing an adaptive depth point extraction process 206.

In particular embodiments, the computing device 106 may first perform object feature point extraction 208. For example, in particular embodiments, the computing device 106 may perform object feature point extraction 208 at pixel locations at which pixel intensity values and depth values may suddenly change based on, for example, a multi-scale feature point extraction algorithm to extract the object feature points. For example, in particular embodiments, an initial layer sampling of the multi-layer sampling of the RGB image data 202A may be performed by extracting the object feature points utilizing, for example, a Difference of Gaussian (DoG) filter, a Laplacian of Gaussian (LoG) filter, or other similar filter that may be useful extracting object feature points from one or more of a number of scaled representations (e.g., Gaussian scale space representations) of the RGB image data 202A. In particular embodiments, subsequent to extracting object feature points from one or more of the number of scaled representations of the RGB image data 202A, the computing device 106 may then integrate the object feature points of all scaled representations and verify each object feature point with the corresponding depth data 204 (e.g., monochromatic depth map, RGB-D image frames). For example, in particular embodiments, the computing device 106 may remove any object feature points at pixel locations at which the depth data 204 (e.g., monochromatic depth map, RGB-D image frames) change only minimally (e.g., smoothly transition) or do not change at all (e.g., along planes, cubes, smooth surfaces, and so forth) as compared to respective neighboring object feature points within the RGB image data 202A. In particular embodiments, during the object feature point extraction 208, the computing device 106 may also generate one or more confidence scores (e.g., ranging from "0" to "100") or a confidence map, which may include, for example, an indication of a likelihood the associated object feature point corresponds to a determinative feature of objects within within RGB image data 202A.

In particular embodiments, the computing device 106 may then perform object edge detection and extraction 210. For example, in particular embodiments, another layer sampling of the multi-layer sampling of the RGB image data 202A may be performed by extracting the object edge features utilizing, for example, a Canny filter, a Sobel filter, or other similar filter that may be useful extracting object edge features from one or more of the number of scaled representations (e.g., Gaussian scale space representations) of the RGB image data 202A to, for example, accurately capture the structure of objects of the RGB image data 202A. In particular embodiments, subsequent to extracting object edge features from one or more of the number of scaled representations of the RGB image data 202A, the computing device 106 may then integrate the object edge features of all scaled representations and verify each object edge feature with the corresponding depth data 204 (e.g., monochromatic depth map, RGB-D image frames).

For example, in particular embodiments, the object edge features may represent object shape changes within the RGB image data 202A as corresponding to changes in depth. In particular embodiments, the computing device 106 may remove any object edge features at pixel locations at which the depth data 204 (e.g., monochromatic depth map, RGB-D image frames) change only minimally (e.g., smoothly transition) or do not change at all (e.g., along planes, cubes, smooth surfaces, and so forth) as compared to respective neighboring object edge features within RGB image data 202A. In particular embodiments, during the object edge detection and extraction 210, the computing device 106 may also generate one or more confidence scores (e.g., ranging from "0" to "100") or a confidence map, which may include, for example, an indication of a likelihood the associated object edge feature corresponds to a determinative feature of objects within the RGB image data 202A.

In particular embodiments, the computing device 106 may then perform object contour detection and extraction 212 and image contour detection and extraction 214. For example, in particular embodiments, another layer sampling of the multi-layer sampling of the RGB image data 202A may be performed by extracting object contour features and image contour features (e.g., background pixels) that may be utilized, for example, to supplement the object feature points and object edge features. For example, in particular embodiments, without the object contour detection and extraction 212 and image contour detection and extraction 214, reconstructed image frames may lose RGB image data 202A and depth data 204 (e.g., monochromatic depth map, RGB-D image frames) information, such as smoothed out features and/or feature points missing from certain object contour locations. In particular embodiments, during the object contour detection and extraction 212 and image contour detection and extraction 214, the computing device 106 may also generate one or more confidence scores (e.g., ranging from "0" to "100") or a confidence map, which may include, for example, an indication of a likelihood the associated object contours and image contours correspond to determinative features of objects within the RGB image data 202A.

In particular embodiments, subsequent to performing the object feature point extraction 208, the object edge detection and extraction 210, and the object contour detection and extraction 212 and image contour detection and extraction 214, the computing device 106 may then integrate the extracted and verified number of feature points, the extracted and verified number of edge features, and the extracted and verified number of object and image contour features to generate a set of sparse feature points. For example, in particular embodiments, the computing device 106 may first perform object contour labeling 216, which may be utilized, for example, classify certain objects or features for applications, such as object recognition, occlusion, 3D analysis, and so forth. In particular embodiments, the computing device 106 may then perform an integration 218 of the extracted and verified number of feature points, the extracted and verified number. For example, in particular embodiments, the computing device 106 may integrate the feature points generated from the feature detection and extraction 208, the edge detection and extraction 210, the object contour detection and extraction 212, and the image contour detection and extraction 214 together to generate a granular and set of sparse feature points. In particular embodiments, during the integration 218, the computing device 106 may perform one or more additional verifications to determine and filter out duplicated feature points and/or feature points that are positioned too closely together for each to be individually resolvable.

In particular embodiments, the computing device 106 may then perform an integration 220 of the generated set of sparse feature points with the corresponding depth data 204 (e.g., monochromatic depth map, RGB-D image frames). In particular embodiments, the computing device 106 may then perform one or more additional verifications to remove any of the sparse set of feature points at pixel locations at which the depth data 204 (e.g., monochromatic depth map, RGB-D image frames) change only minimally (e.g., smoothly transition) or do not change at all as compared to respective neighboring sparse feature points within the RGB image data 202A. In particular embodiments, based on the verification of the set of sparse feature points with the depth data 204, the computing device 106 may then generate a granular and set of sparse depth points 222. In particular embodiments, the computing device 106 may then divide the set of sparse depth points into, for example, two or more levels of sparse depth points based on the respective confidence scores or confidence maps predetermined with respect to the object feature point extraction 208, the object edge detection and extraction 210, and the object contour detection and extraction 212 and image contour detection and extraction 214 discussed above.

In particular embodiments, the computing device 106 may then transmit the set of sparse depth points 224 to the XR display device 102 over the network 104. For example, in particular embodiments, by generating the two or more levels of sparse depth points divided according to the respective confidence scores or confidence maps, the computing device 106 may control and reduce, for example, the number of depth points that is transmitted to the XR display device 102 at any point in time without compromising the quality of the depth map reconstruction and re-projection performed by the XR display device 102. For example, in particular embodiments, when the network 104 bandwidth and/or throughput conditions are suitable for large data transmissions, larger sets of sparse depth points may be transmitted to the XR display device 102, and, in contrast, when the network 104 bandwidth and/or throughput conditions are unsuitable for large data transmissions, reduced-sized sets of sparse depth points may be transmitted to the XR display device 102.

In particular embodiments, as previously discussed, the XR display device 102 may receive the set of sparse depth points 224 from the computing device 106. In particular embodiments, the XR display device 102 may also receive the RGB image data 202B (e.g., one or more current RGB image frames) from the computing device 106. In particular embodiments, the XR display device 102 may then perform dense depth map reconstruction 226 based on the set of sparse depth points 224 received from the computing device 106. In particular embodiments, the XR display device 102 may then compute one or more depth differences between pixel locations r and one or more respective neighboring pixel locations s (e.g., a weighted average of the neighboring pixel locations s) within the RGB image data 202B. For example, in particular embodiments, the XR display device 102 may compute the one or more depth differences as expressed below:

$$D_{diff}(D) = \Sigma_r (D(r) - \Sigma_{s \in N(r)} W_{rs} D(s))^2, \quad (1)$$

where
D(r) is the depth at pixel r;
D(s) is the depth at pixel s;
N(r) is the neighborhood of pixel r;
s is the neighborhood pixel of pixel r;
$W_{rs}$ is the weight created with neighborhood pixels, $$W_{rs} = C e^{-(I(r)-I(s))^2/2\sigma^2}, \quad (2)$$

C is a constant;
I(r) is the intensity at pixel r;
I(s) is the intensity at pixel s;
$\sigma_r$ is variance of the intensities in a window around r;
We can also use another form of weight, $$W_{rs} = C(1 + 1/\sigma_r^2 (I(r) - \mu_r)(I(s) - \mu_r)) \quad (3)$$

$\mu_r$ is the mean of the intensities in a window around r.

In particular embodiments, the XR display device 102 may then minimize the one or more depth differences 230 to determine the depth at one or more particular pixel locations r and may iteratively perform the minimizing of the one or more depth differences 230 until the depth at each pixel location r is determined. For example, in particular embodiments, for each pixel location r for which depth is undetermined, XR display device 102 may define a window with its respective neighboring pixel location s and generate an objective function of depth difference. In particular embodiments, the XR display device 102 may then minimize the objective function to obtain depth at each pixel location r. For example, in particular embodiments, the XR display device 102 may minimize the one or more depth differences 230 to determine the depth at one or more particular pixel locations r as expressed by:

$$D(r) \rightarrow \min D_{diff}(D) \quad (4)$$

In particular embodiments, the XR display device 102 may then reconstruct a dense depth map 232, which may include, for example, a reconstruction or partial reconstruction of the original depth data 204. In particular embodiments, based on the RGB image data 202B and the dense depth map 232, the XR display device 102 may then perform one or more re-projections 234 of RGB-D image frames onto the displays of the XR display device 102.

Thus, in accordance with the presently disclosed embodiments, to reduce network traffic between the XR display device 102 and the computing device 106, and, by extension, to reduce power consumption and thermal output of the XR display device 102, the computing device 106 may perform an adaptive process that extracts feature points from the RGB image data 202A and depth data 204 (e.g., grayscale depth image frames) at pixel locations at which depths suddenly change, such as object contours, object edges, and object features. Contrastingly, the computing device 106 may forgo extracting feature points, edge points, contour points, and so forth where depths change only minimally (e.g., smoothly transition) or do not change at all, such as planes, cubes, and smooth surfaces of the RGB image data 202A and depth data 204. In this way, the computing device 106 may provide to the XR display device 102 a depth map for reconstruction and re-projection, including only sparse depth points and sufficient object information to effectively and efficiently recover the depth information of the original RGB image data 202A and depth data 204 (e.g., grayscale depth image frames) generated by the computing device 106. The presently disclosed embodiments may thus reduce the data throughput (e.g., Wi-Fi data throughput) and compute load between the computing device 106 and the XR display device 102 while maintaining desirable image quality with respect the reconstructed image data 202A and depth data 204 (e.g., grayscale depth image frames) ultimately projected and/or re-projected onto the displays of the XR display device 102.

Figure 3:
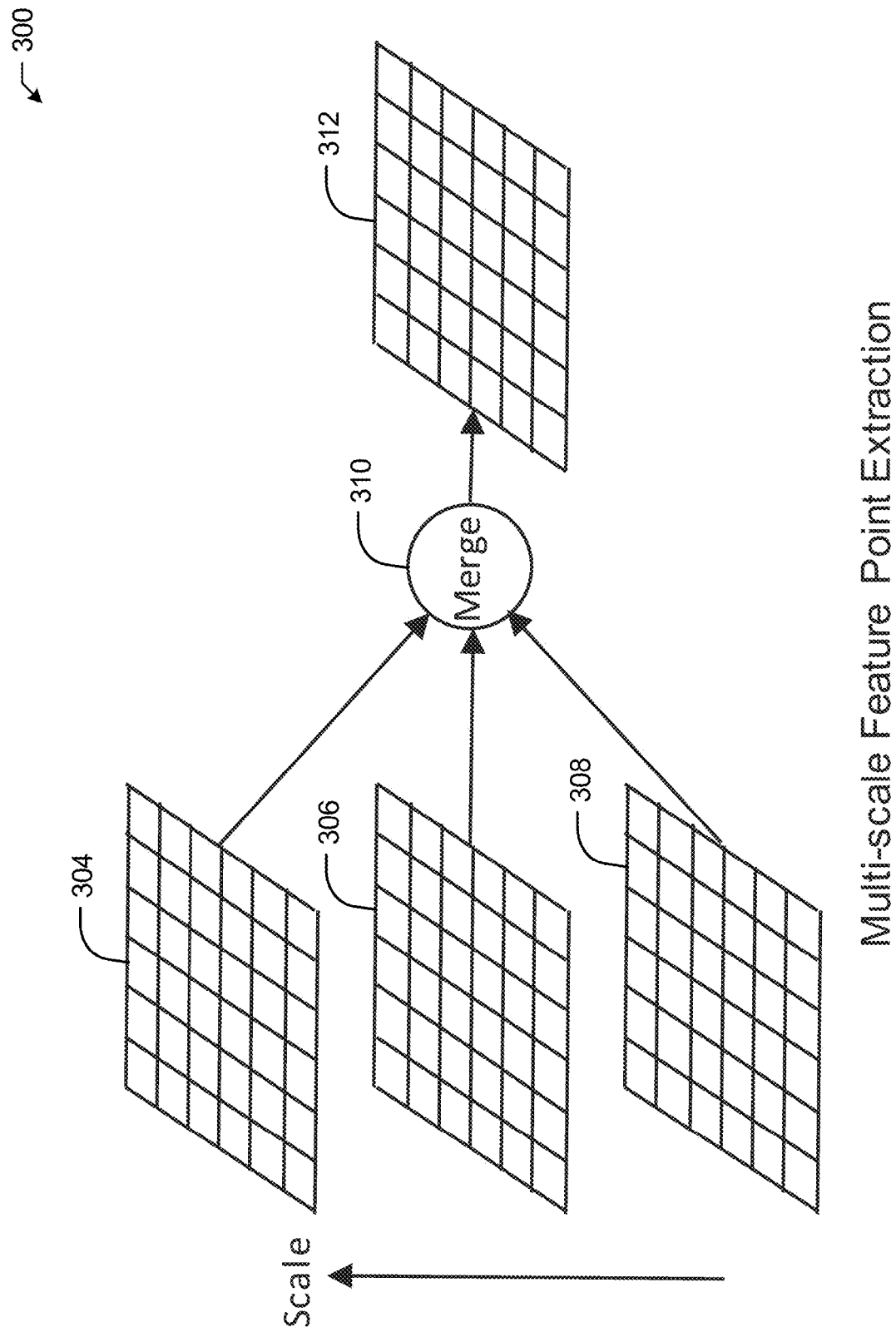
FIG. 3 illustrates an example diagram of multi-scale feature point extraction.

FIG. 3 illustrates an example diagram 300 of the detection of the feature points of the RGB image data 202A as discussed above with respect to FIG. 2. For example, in particular embodiments, the RGB image data 202 may be scaled to a number of scaled representations 304, 306, and 308 (e.g., Gaussian scale space representations). For example, in particular embodiments, each of the number of scaled representations 304, 306, and 308 (e.g., Gaussian scale space representations) may represent, for example, the RGB image data 202A as a series of differently blurred images scaled from least blurred (scaled representation 304) to greatest blurred (e.g., scaled representation 308). In particular embodiments, as discussed above with respect to FIG. 2, the number of scaled representations 304, 306, and 308 (e.g., Gaussian scale space representations) may be then integrated by a combiner 310 (e.g., summed together) and utilized to generate an integrated set 312 of the feature points of the RGB image data 202A. Indeed, it should be appreciated that the example diagram 300 represents only one embodiment of the detection and extraction of the feature points of the RGB image data 202A. In accordance with the presently disclosed embodiments, the process as illustrated by the example diagram 300 may be performed individually for each of the detection and extraction of the feature points, edge features, and object and image contour features of the RGB image data 202A.

Figure 4B:
FIGS. 4A, 4B, 4C, 4D, and 4E illustrate respective example source image and running examples of techniques for generating a set of feature points, edges, object contours, and image contours.
Figure 4A:
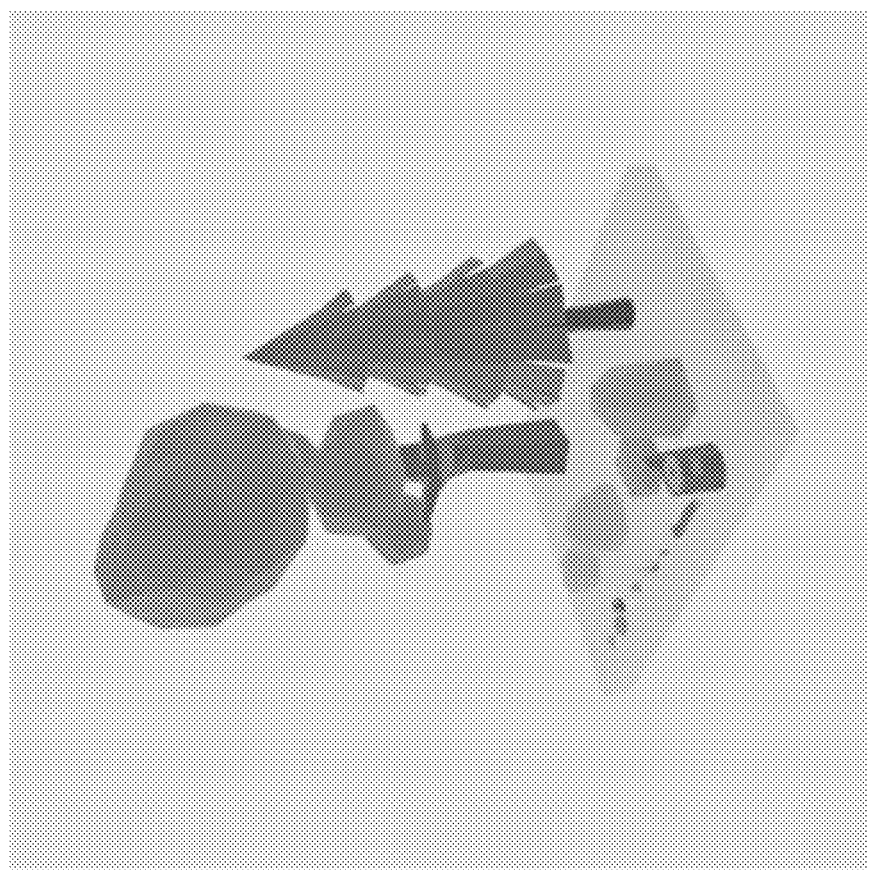
Figure 4E:
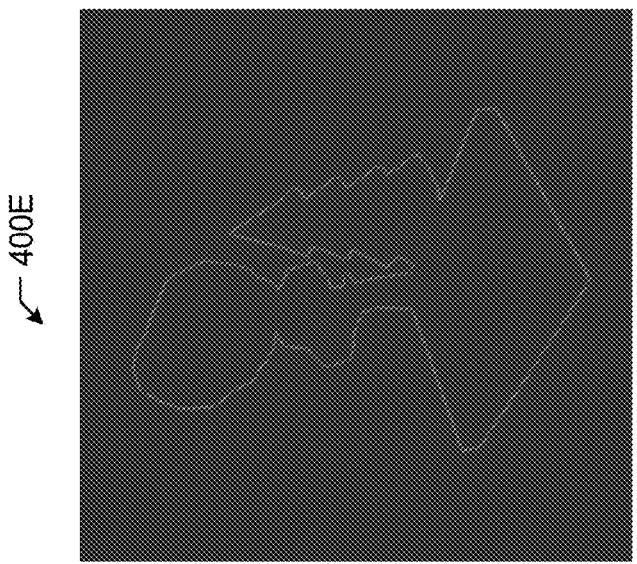
Figure 4D:
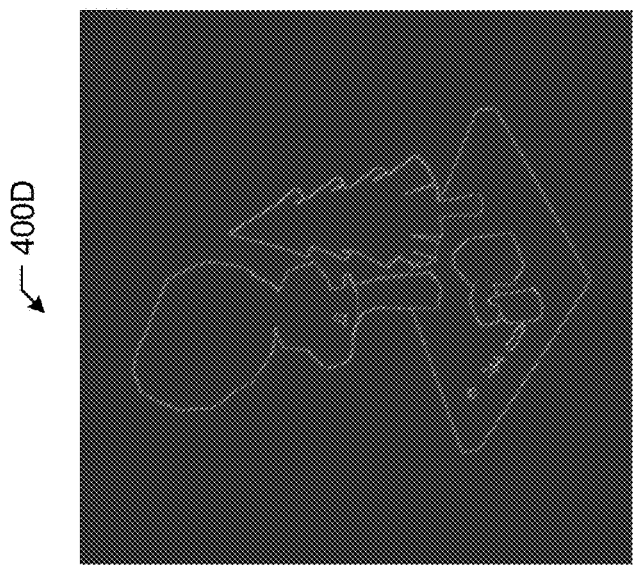
Figure 4C:
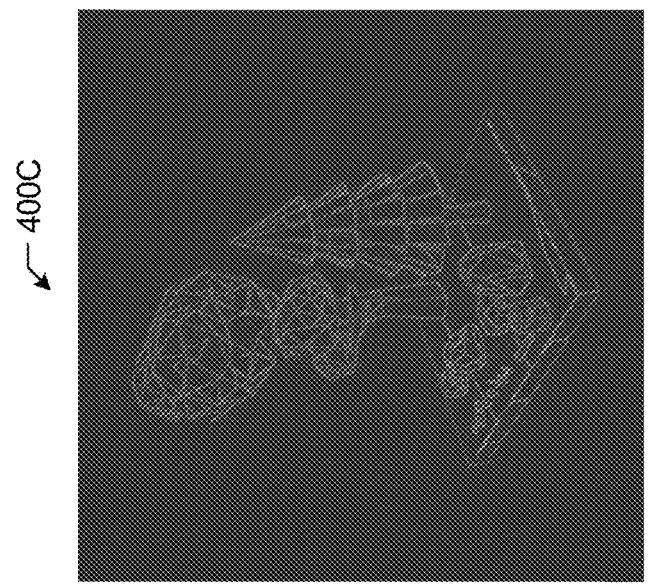

FIGS. 4A, 4B, 4C, 4D, and 4E illustrate respective running examples of the techniques for generating a set of sparse depth points and reconstructing a dense depth map based on the generated sparse depth points, as discussed above with respect to FIG. 2. For example, FIG. 4A illustrates an original RGB-D image 400A that may be generated by the computing device 106 and to be displayed by the XR display device 102. FIG. 4B illustrates an example result 400B of the detection, extraction, integration, and depth verification of the feature points as discussed above with respect to FIG. 2, with the feature points being color-coded respect to confidence score. FIG. 4B illustrates an example result 400B of the detection, extraction, integration, and depth verification of the feature points as discussed above with respect to FIG. 2, with the feature points being color-coded respect to confidence score. FIG. 4C illustrates an example result 400C of the detection, extraction, integration, and depth verification of the edge features as discussed above with respect to FIG. 2. FIG. 4D illustrates an example result 400D of the detection, extraction, and depth verification of the object contour features and FIG. 4E illustrates an example result 400E of the detection, extraction, integration, and depth verification of the image contour features, as each discussed above with respect to FIG. 2.

Figure 5A:
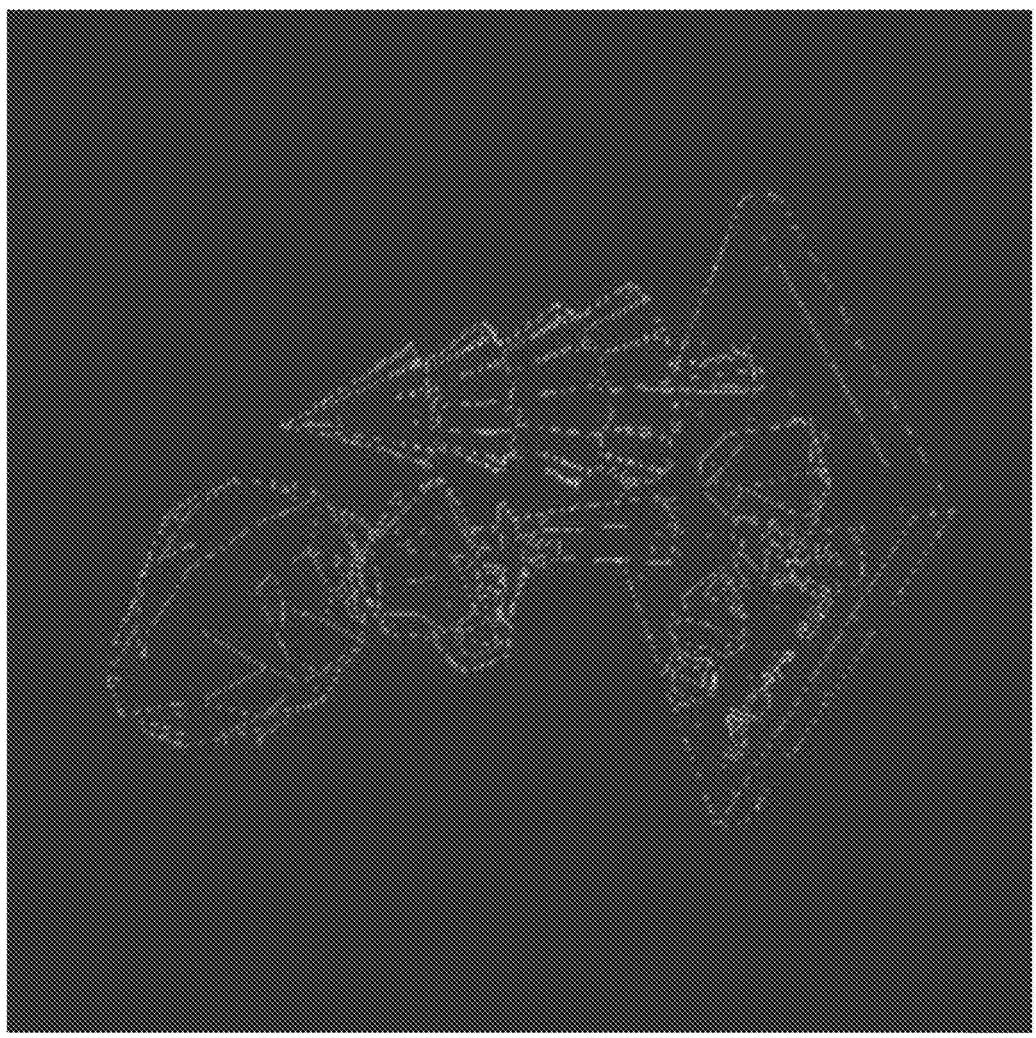
FIG. 5A illustrates a resulting example of integrating detected image features to a set of sparse depth points.

FIG. 5A illustrates a resulting example 500A of integrating a set of sparse depth points selected from original depth map 204 corresponding to extracted feature points, edge features, contour features illustrated in FIGS. 4A, 4B, 4C, 4D, and 4E, in accordance with the presently disclosed embodiments. For example, as illustrated by FIG. 5A, and in accordance with the presently disclosed embodiments, the example 500 may represent a reconstruction of the original RGB-D image 400A of FIG. 4A reconstructed based on, for example, a set of sparse depth points determined based on an integrated set of sparse feature points derived from the detected, extracted, integrated, and depth verified feature points (e.g., as illustrated by FIG. 4B), edge features (e.g., as illustrated by FIG. 4C), and object contour and image contour features (as illustrated by FIG. 4D and FIG. 4E, respectively).

Figure 5B:
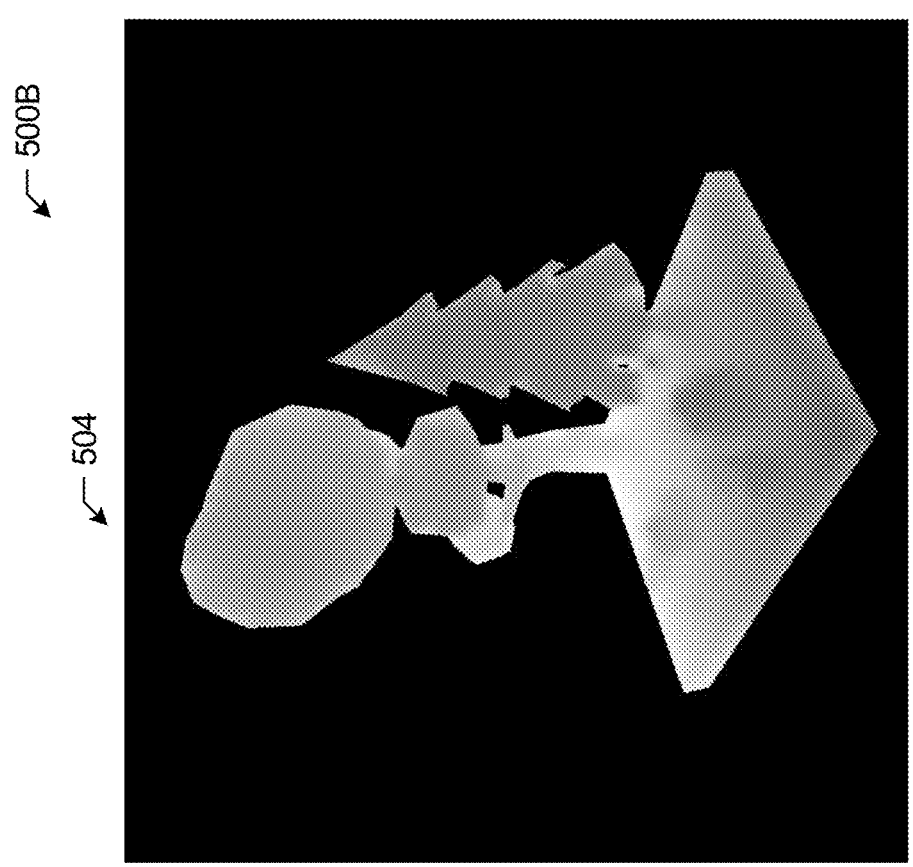
FIG. 5B illustrates example depth map results reconstructed from extracted sparse depth point sets.
Figure 5B:
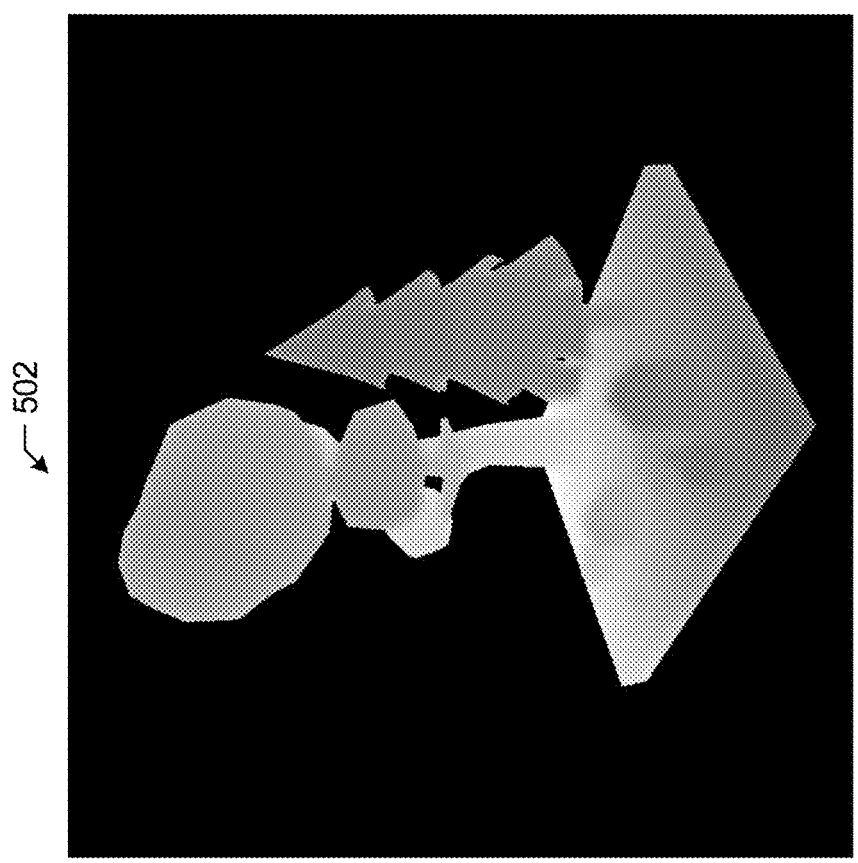

FIG. 5B illustrates example depth map results reconstructed from extracted sparse depth point sets, in accordance with the presently disclosed embodiments. For example, as illustrated by FIG. 5B, and in accordance with the presently disclosed embodiments, example 502 and example 504 show depth map reconstructed from 16494 depth points and 1823 depth points, respectively. In this way, the computing device 106 may provide to the XR display device 102 a depth map for reconstruction and re-projection, including only a set of sparse depth points and sufficient object information to effectively and efficiently recover the depth information of the original RGB image data 202A and depth data 204 (e.g., grayscale depth image frames) generated by the computing device 106. The presently disclosed embodiments may thus reduce the data throughput (e.g., Wi-Fi data throughput) and compute load between the computing device 106 and the XR display device 102 while maintaining desirable image quality with respect the reconstructed image data 202A and depth data 204 (e.g., grayscale depth image frames) ultimately projected and/or re-projected onto the displays of the XR display device 102.

Figure 6:
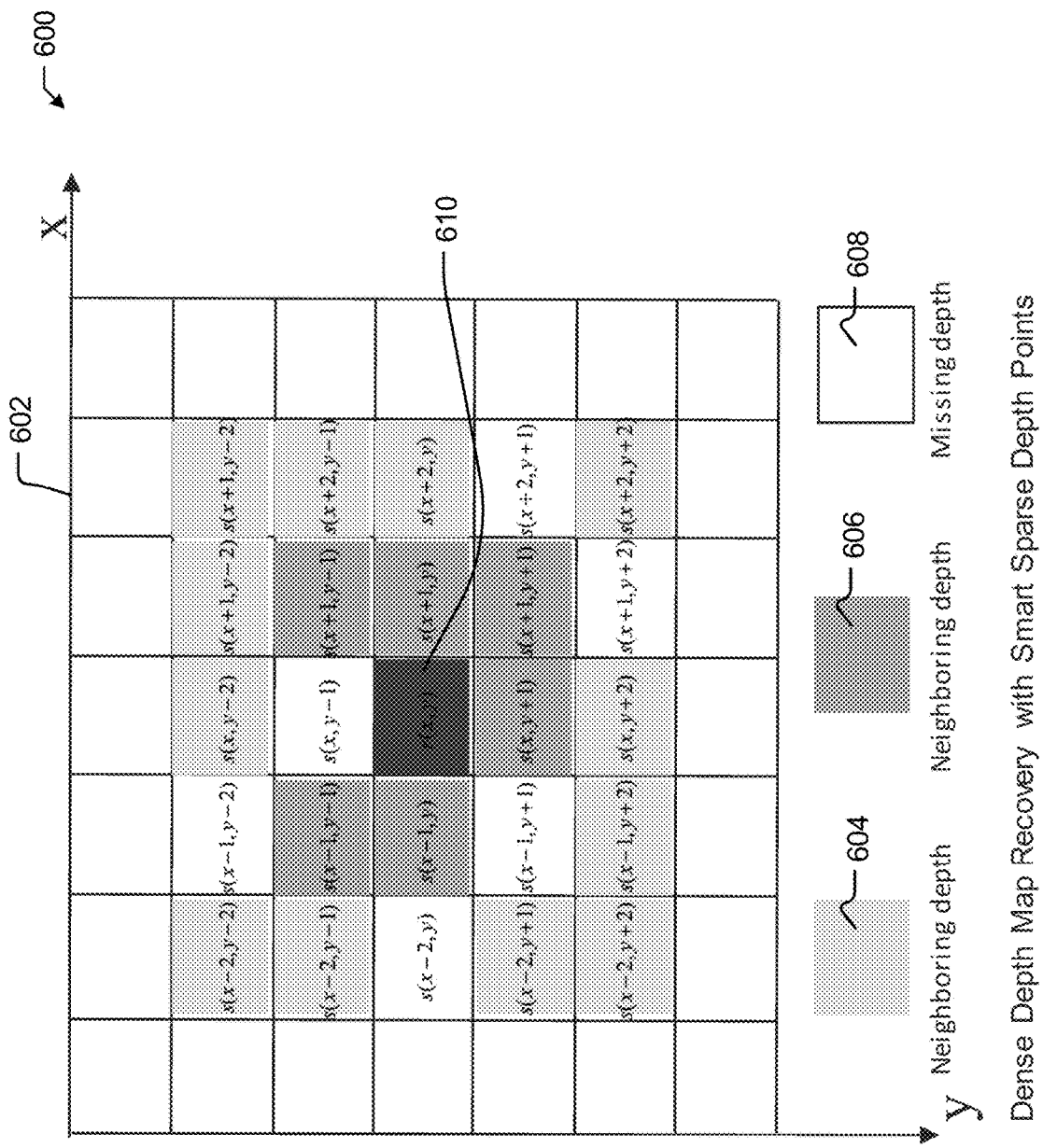
FIG. 6 illustrates an example diagram illustration for reconstructing a dense depth map based on a generated set of sparse depth points.

FIG. 6 illustrates an example diagram 600 of the reconstruction of a dense depth map based on, for example, the set of sparse depth points received from the computing device 106, as generally discussed above with respect to the workflow diagram 200B of FIG. 2. For example, as depicted by the RGB pixel grid 602, in particular embodiments, the XR display device 102 may compute one or more depth differences between, for example, pixel locations 604 (e.g., pixel locations r) and one or more respective neighboring pixel locations 606 and 608 (neighboring pixels s) within the RGB pixel grid 602. In particular embodiments, the XR display device 102 may then minimize the one or more depth differences to determine the depth at one or more particular pixel locations 604 (e.g., pixel locations r) and may iteratively perform the minimizing of the one or more depth differences until the depth at each pixel location 604 (e.g., pixel locations r) is determined. For example, in particular embodiments, for each pixel location 604 (e.g., pixel location r) for which depth is undetermined, XR display device 102 may define a window with its respective neighboring pixel location 606, 608 (e.g., neighboring pixel location s) and generate an objective function of depth difference. In particular embodiments, the XR display device 102 may then minimize the objective function to obtain depth at each pixel location 604 (e.g., pixel location r). For example, the missing pixel locations 610 may represent pixel locations for which depth is undetermined, and thus the aforementioned depth difference and minimization techniques may be iteratively performed to determine depth for each of the missing pixel locations 610. In particular embodiments, once the depth data is determined for each of the pixel of the RGB pixel grid 602, the XR display device 102 may then reconstruct a dense depth map and re-project one or more RGB-D image frames.

Figure 7:
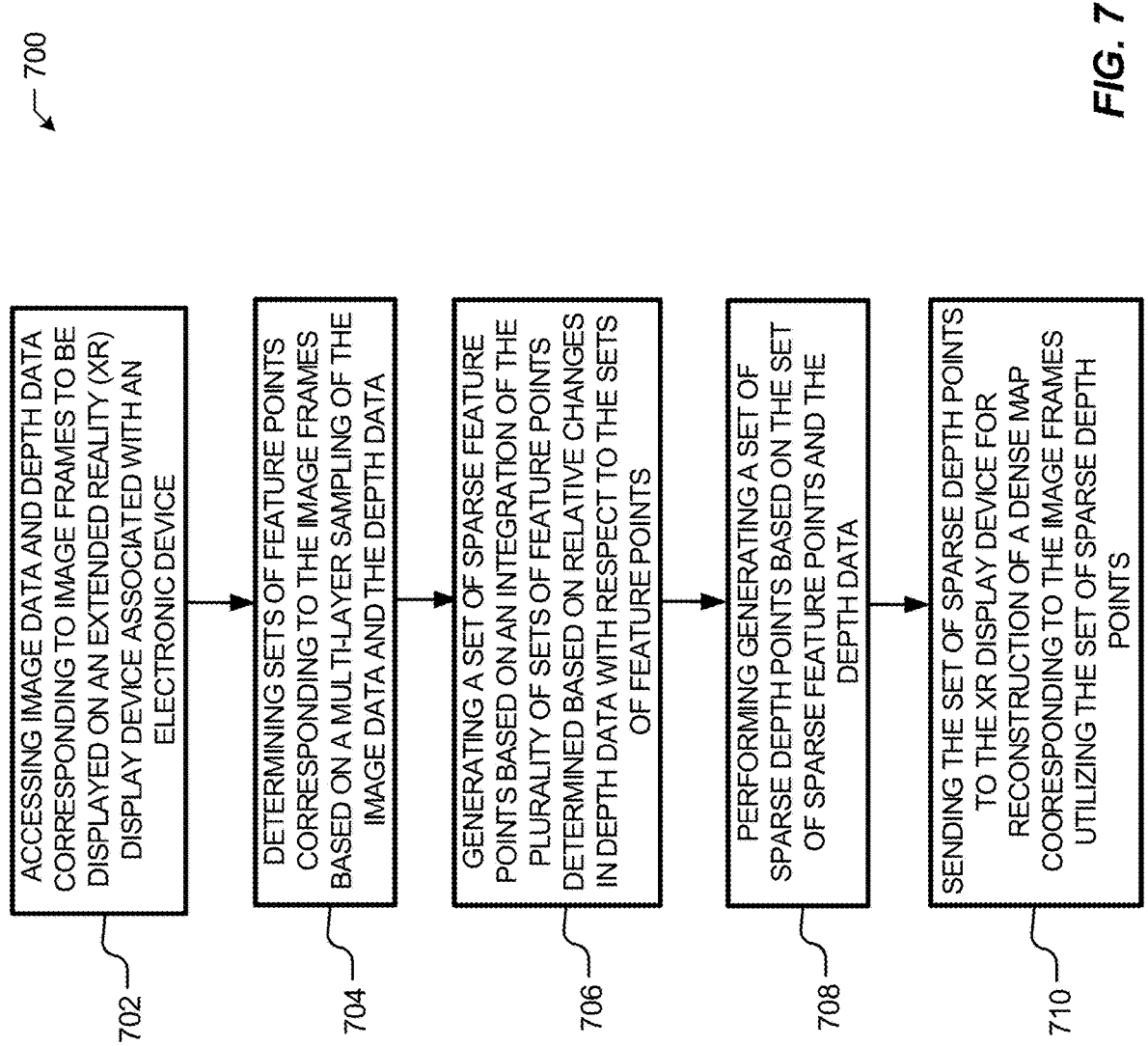
FIG. 7 illustrates is a flow diagram of a method for generating a set of sparse depth points and reconstructing a dense depth map based on the generated sparse depth points.

FIG. 7 illustrates is a flow diagram of a method 700 for generating a set of sparse depth points and reconstructing a dense depth map based on the generated sparse depth points, in accordance with the presently disclosed embodiments. The method 700 may be performed utilizing one or more processing devices (e.g., computing device 106) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing image data), software (e.g., instructions running/executing on one or more processors), firmware (e.g., microcode), or some combination thereof.

The method 700 may begin block 702 with the one or more processing devices (e.g., computing device 106) accessing image data and depth data corresponding to one or more image frames to be displayed on an extended reality (XR) display device associated with the computing device. The method 700 may then continue at block 704 with the one or more processing devices (e.g., computing device 106) determining a plurality of sets of feature points corresponding to the one or more image frames based on a multi-layer sampling of the image data and the depth data. The method 700 may then continue at block 706 with the one or more processing devices (e.g., computing device 106) generating a set of sparse feature points based on an integration of the plurality of sets of feature points, in which the set of sparse feature points are determined based on relative changes in depth data with respect to the plurality of sets of feature points. The method 700 may then continue at block 708 with the one or more processing devices (e.g., computing device 106) generating a set of sparse depth points based on the set of sparse feature points and the depth data.

The method 700 may then conclude at block 710 with the one or more processing devices (e.g., computing device 106) sending the set of sparse depth points to the XR display device for reconstruction of the one or more image frames utilizing the set of sparse depth points. Thus, in accordance with the presently disclosed embodiments, to reduce network traffic between the XR display device 102 and the computing device 106, and, by extension, to reduce power consumption and thermal output of the XR display device 102, the computing device 106 may perform an adaptive process that extracts feature points from the RGB image data 202A and depth data 204 (e.g., RGB-D image frames) at pixel locations at which depths suddenly change, such as object contours, object edges, and object features. Contrastingly, the computing device 106 may forgo extracting feature points, edge points, contour points, and so forth where depths change only minimally (e.g., smoothly transition) or do not change at all, such as planes, cubes, and smooth surfaces of the RGB image data 202A and depth data 204. In this way, the computing device 106 may provide to the XR display device 102 a depth map for reconstruction and re-projection, including only sparse depth points and sufficient object information to effectively and efficiently recover the depth information of the original RGB image data 202A and depth data 204 (e.g., RGB-D image frames) generated by the computing device 106. The presently disclosed embodiments may thus reduce the data throughput (e.g., Wi-Fi data throughput) and compute load between the computing device 106 and the XR display device 102 while maintaining desirable image quality with respect the reconstructed image data 202A and depth data 204 (e.g., RGB-D image frames) ultimately projected and/or re-projected onto the displays of the XR display device 102.

Figure 8:
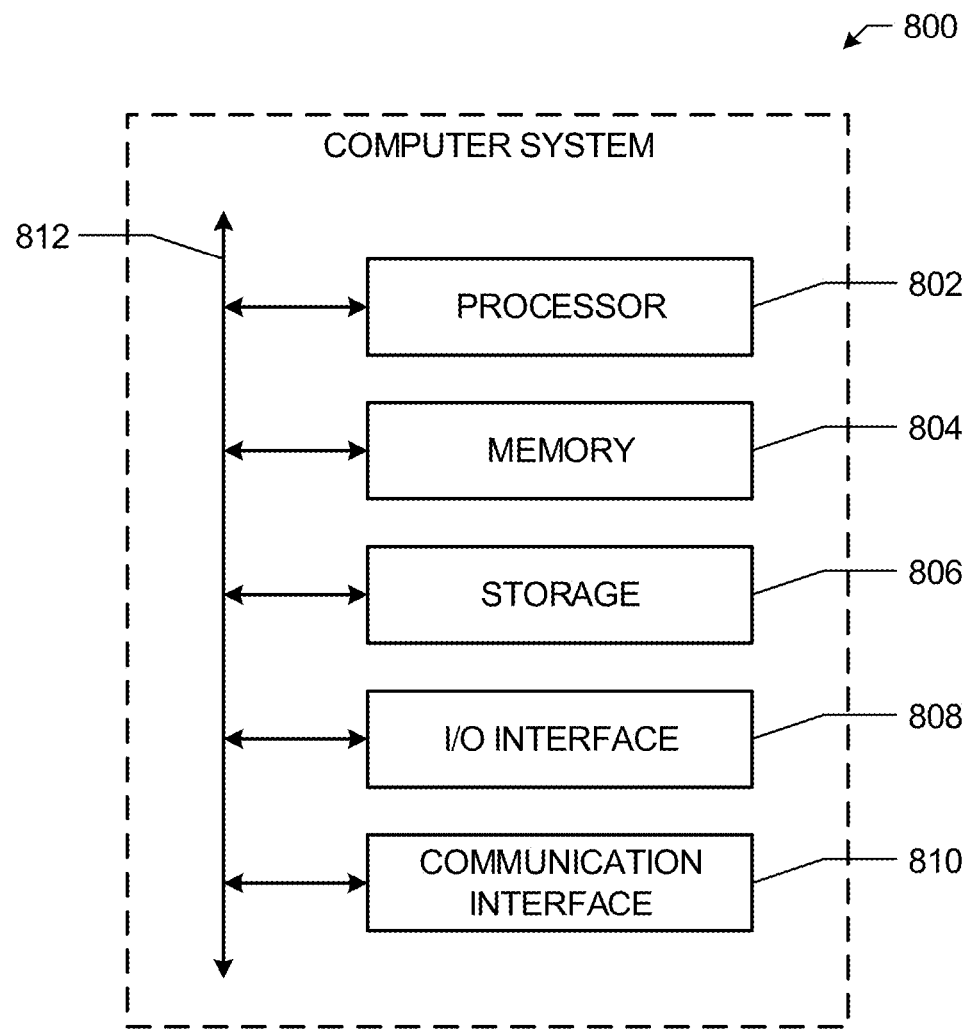
FIG. 8 illustrates an example computer system.

FIG. 8 illustrates an example computer system 800 that may be utilized for generating a set of sparse depth points and reconstructing a dense depth map based on the generated sparse depth points, in accordance with the presently disclosed embodiments. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks.

Where appropriate, one or more computer systems 800 may perform without substantial spatial or temporal limitation one or more steps of one or more methods described or illustrated herein. As an example, and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example, and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example, and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802.

Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example, and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere).

One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example, and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 806 for them. Where appropriate, I/O interface 808 may include one or more device or software drivers enabling processor 802 to drive one or more of these I/O devices. I/O interface 808 may include one or more I/O interfaces 806, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example, and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it.

As an example, and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example, and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g. method, may be claimed in another claim category, e.g. system, as well. The dependencies or references back in the attached claims are chosen for formal reasons only. However, any subject matter resulting from a deliberate reference back to any previous claims (in particular multiple dependencies) may be claimed as well, so that any combination of claims and the features thereof are disclosed and may be claimed regardless of the dependencies chosen in the attached claims. The subject-matter which may be claimed comprises not only the combinations of features as set out in the attached claims but also any other combination of features in the claims, wherein each feature mentioned in the claims may be combined with any other feature or combination of other features in the claims. Furthermore, any of the embodiments and features described or depicted herein may be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing device:
   accessing image data and depth data corresponding to one or more image frames to be displayed on an extended reality (XR) display device associated with the computing device;
   determining a plurality of sets of feature points corresponding to the one or more image frames based on a multi-layer sampling of the image data and the depth data;
   generating a set of sparse feature points based on an integration of the plurality of sets of feature points, wherein the set of sparse feature points are determined based on relative changes in depth data with respect to the plurality of sets of feature points, and wherein the set of sparse feature points are associated with a set of confidence scores, wherein each confidence score identifies how determinative a feature is for representing one or more objects in the one or more image frames;
   generating a set of sparse depth points based on the set of sparse feature points and the depth data;
   dividing the set of sparse depth points into two or more levels of sparse depth points, wherein the sparse depth points are divided into each level based on the respective set of confidence scores associated with the sparse depth feature points;
   determining, based at least on a data throughput between the computing device and an XR device, which of one or more levels of sparse depth points to send to the XR device; and
   sending the determined one or more levels of sparse depth points to the XR display device for reconstruction of a dense depth map corresponding to the one or more image frames utilizing the one or more levels of sparse depth points.

2. The method of claim 1, wherein the plurality of sets of feature points comprises two or more of a set of object feature points, a set of edge feature points, a set of object contour points, or a set of image contour points.

3. The method of claim 1, wherein the multi-layer sampling of the image data and the depth data is performed by extracting the plurality of sets of feature points utilizing two or more of a Difference of Gaussian (DoG) filter, a Laplacian of Gaussian (LoG) filter, a Canny filter, or a Sobel filter.

4. The method of claim 3, wherein the plurality of sets of feature points are extracted for each of a plurality of scaled representations corresponding to the one or more image frames.

5. The method of claim 4, wherein generating the set of sparse feature points comprises:

integrating the plurality of sets of feature points extracted for each of the plurality of scaled representations; and removing a subset of feature points from the integrated plurality of sets of feature points based on relative changes in depth data between the subset of feature points and respective neighboring feature points.

6. The method of claim 1, further comprising:

sending the image data to the XR display device;

wherein the dense depth map corresponding to the one or more image frames is re-projected by the XR display device based on the one or more levels of sparse depth points and the image data.

7. A computing device, comprising:

one or more non-transitory computer-readable storage media including instructions; and one or more processors coupled to the storage media, the one or more processors configured to execute the instructions to:

access image data and depth data corresponding to one or more image frames to be displayed on an extended reality (XR) display device associated with the computing device;

determine a plurality of sets of feature points corresponding to the one or more image frames based on a multi-layer sampling of the image data and the depth data;

generate a set of sparse feature points based on an integration of the plurality of sets of feature points, wherein the set of sparse feature points are determined based on relative changes in depth data with respect to the plurality of sets of feature points, and wherein the set of sparse feature points are associated with a set of confidence scores, wherein each confidence score identifies how determinative a feature is for representing one or more objects in the one or more image frames;

generate a set of sparse depth points based on the set of sparse feature points and the depth data;

divide the set of sparse depth points into two or more levels of sparse depth points, wherein the sparse depth points are divided into each level based on the set of confidence scores associated with the sparse feature points;

determine, based at least on a data throughput between the computing device and an XR device, which of one or more levels of sparse depth points to send to the XR device; and send the determined one or more levels of sparse depth points to the XR display device for reconstruction of a dense depth map corresponding to the one or more image frames utilizing the one or more levels of sparse depth points.

8. The computing device of claim 7, wherein the plurality of sets of feature points comprises two or more of a set of object feature points, a set of edge feature points, a set of object contour points, or a set of image contour points.

9. The computing device of claim 7, wherein the multi-layer sampling of the image data and the depth data is performed by extracting the plurality of sets of feature points utilizing two or more of a Difference of Gaussian (DoG) filter, a Laplacian of Gaussian (LoG) filter, a Canny filter, or a Sobel filter.

10. The computing device of claim 9, wherein the plurality of sets of feature points are extracted for each of a plurality of scaled representations corresponding to the one or more image frames.

11. The computing device of claim 10, wherein the instructions to generate the set of sparse feature points further comprises instructions to:

integrate the plurality of sets of feature points extracted for each of the plurality of scaled representations; and remove a subset of feature points from the integrated plurality of sets of feature points based on relative changes in depth data between the subset of feature points and respective neighboring feature points.

12. The computing device of claim 7, wherein the instructions to send the set of sparse depth points to the XR display device further comprises instructions to:

send the image data to the XR display device, wherein the dense depth map corresponding to the one or more image frames is re-projected by the XR display device based on the one or more levels of sparse depth points and the image data.

13. A non-transitory computer-readable medium comprising instructions that, when executed by one or more processors of a computing device, cause the one or more processors to:

access image data and depth data corresponding to one or more image frames to be displayed on an extended reality (XR) display device associated with the computing device;

determine a plurality of sets of feature points corresponding to the one or more image frames based on a multi-layer sampling of the image data and the depth data;

generate a set of sparse feature points based on an integration of the plurality of sets of feature points, wherein the set of sparse feature points are determined based on relative changes in depth data with respect to the plurality of sets of feature points, and wherein the set of sparse feature points are associated with a set of confidence scores wherein each confidence score identifies how determinative a feature is for representing one or more objects in the one or more image frames;

generate a set of sparse depth points based on the set of sparse feature points and the depth data;

divide the set of sparse depth points into two or more levels of sparse depth points, wherein the sparse depth points are divided into each level based on the set of confidence scores associated with the sparse feature points;

determine, based at least on a data throughput between the computing device and an XR device, which of one or more levels of sparse depth points to send to the XR device; and send the determined one or more levels of sparse depth points to the XR display device for reconstruction of a dense depth map corresponding to the one or more image frames utilizing the one or more levels of sparse depth points.

14. The non-transitory computer-readable medium of claim 13, wherein the plurality of sets of feature points comprises two or more of a set of object feature points, a set of edge feature points, a set of object contour points, or a set of image contour points.

15. The non-transitory computer-readable medium of claim 13, wherein the multi-layer sampling of the image data and the depth data is performed by extracting the plurality of sets of feature points utilizing two or more of a Difference of Gaussian (DoG) filter, a Laplacian of Gaussian (LoG) filter, a Canny filter, or a Sobel filter.

16. The non-transitory computer-readable medium of claim 15, wherein the plurality of sets of feature points are extracted for each of a plurality of scaled representations corresponding to the one or more image frames, and wherein the instructions to generate the set of sparse feature points further comprises instructions to:
- integrate the plurality of sets of feature points extracted for each of the plurality of scaled representations; and
- remove a subset of feature points from the integrated plurality of sets of feature points based on relative changes in depth data between the subset of feature points and respective neighboring feature points.

17. The non-transitory computer-readable medium of claim 13, wherein the instructions to send the set of sparse depth points to the XR display device further comprises instructions to:
- send the image data to the XR display device,
- wherein the dense depth map corresponding to the one or more image frames is re-projected by the XR display device based on the one or more levels of sparse depth points and the image data.

\* \* \* \* \*